Patented Aug. 4, 1936

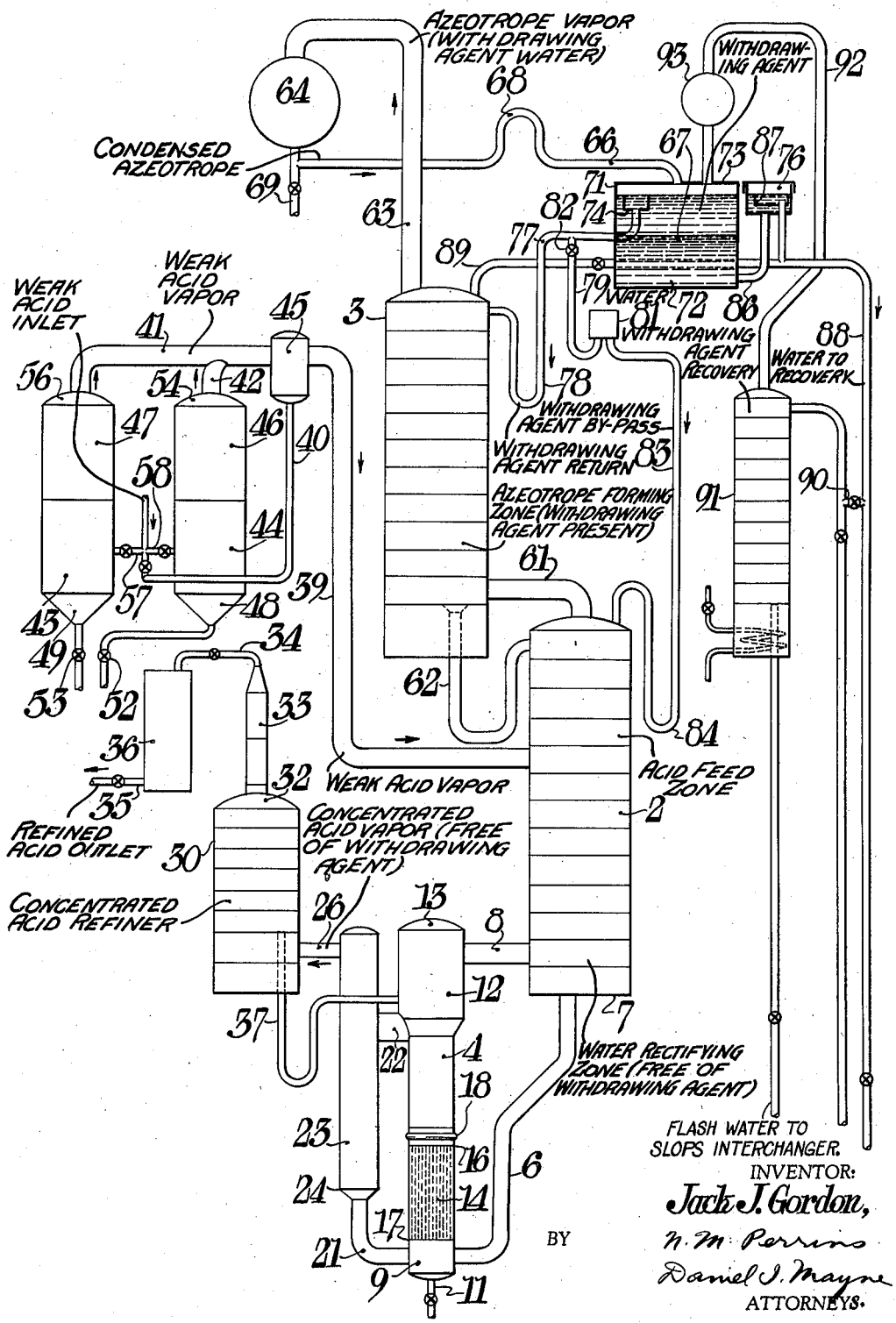

2,049,441

UNITED STATES PATENT OFFICE

2,049,441

PROCESS OF OPERATION FOR AZEOTROPIC DISTILLATION

Jack J. Gordon, Kingsport, Tenn., assignor to Eastman Kodak Company, Rochester, N. Y., a corporation of New York Application June 12, 1935, Serial No. 26,226

11 Claims. (Cl. 202—42)

This invention relates to processes of removing water from aqueous solutions containing aliphatic acids and more particularly to azeotropic distillation processes for the dehydration of dilute aqueous solutions of acetic, propionic, and other aliphatic acids or mixtures thereof. This application is a continuation in part of my application S. N. 744,250, filed September 15, 1934.

A large number of azeotropic processes for dehydrating aliphatic acids have been developed with the following general procedure, prior to my invention, considered necessary.

Namely, excess entraining agent was employed to remove the water and produce a mixture of entraining agent and acetic acid for example, after which these constituents were separated in order to recover the acid.

This prior art procedure may be better considered by reference to specific instances. For example, in U. S. 1,804,745 it is stated:

"Since an excess of ethylene dichlorid is used, say over nine times the weight of the water to be removed, the liquid in vessel 3 will finally become a dehydrated mixture of ethylene dichlorid and glacial acetic acid. This can be withdrawn, through pipe 300 controlled by valve 301 and the two ingredients separated by fractional distillation in any usual apparatus, this being easy because of the wide difference in the boiling points."

Similar procedure, leading to a mixture of acid and entraining agent, was recommended in employing such agents as butyl acetate (see U. S. Patent 1,860,512 for example). However, it is stated by H. Guinot in Chemie et Industrie, vol. 21, No. 2, February, 1929, under the heading "Separation of solvent and acetic acid:"

"If we consider butyl acetate and mesityl oxide, when there is a difference of 7° to 9° only between the boiling points of the acid and solvent, the perfect separation by simple rectification is absolutely impossible."

Consequently, in order to separate the acid mixture with butyl acetate and similar agents it was necessary to resort to complicated procedure and the use of an auxiliary agent. This procedure and other procedure being summarized in paragraph 6, page 1 of U. S. 1,958,898.

The prior art procedure of obtaining a mixture of anhydrous acid with an entraining agent like ethylene dichloride, and then separating the agent by treating the mixture to drive off the agent from the acid is operative and reasonably satisfactory for an agent, such as ethylene dichloride, having the proper vapor pressure characteristics and boiling sufficiently below the boiling point of anhydrous acetic acid to permit a clean cut separation therefrom by simple rectification. However, such procedure alone, as evidenced by Guinot's statements, is not efficient or satisfactory with higher boiling agents.

These agents boiling close to the boiling point of the acid being treated, such as for example agents containing propyl acetate (B. P. 102° C.) or butyl acetate (B. P. 126° C.) or mixtures of the agents with their alcohols, all of which agents boil quite close to the boiling point of acetic acid (B. P. 118° C.), are very efficient water withdrawing agents.

I have developed a new and simplified process of employing these efficient agents and numerous other agents to be described hereinafter, whereby disadvantages of the prior art may be largely avoided and a pure dehydrated aliphatic acid free of entraining agent produced.

My new process is described to some extent in my copending application 744,250 already referred to. As there stated it is an important feature that the process be operated so that finally dehydrated or substantially concentrated acid at no time during the process is contaminated with entraining agent. As further stated, this may be accomplished to some extent by keeping on the water side, (i. e.) if anything having some excess of water present. The most important feature being, as pointed out in my co-pending application, to cause the azeotropic composition to form only in the upper part of the distillation unit. That is, to maintain the lower part of the distillation unit free of entraining agent and in this lower part vaporize the dilute acid upwardly to meet the entrainer in the upper part of the distillation unit. The substantially concentrated acid remains in the lower part of the unit and the lowermost part of the column.

In this way the bulk of the materials in the distillation unit below the aqueous feed comprises acid with or without water, but in all instances free of entraining agent, the bulk of the entraining agent being in the part of the distillation unit above the feed, these features being more fully set forth as the description proceeds.

This invention has as an object to provide a process of removing water from dilute solutions of acetic, propionic, and other aliphatic acids or mixtures thereof. A further object is to provide a process which is applicable not only to relatively pure water solutions of acetic, propionic and other acids, but also to the production of dehydrated acid from crude aqueous solutions, such as pyroligneous liquor. A still further object is to provide a process for the concentration of aqueous solutions of acetic acid mixed with varying proportions of other aliphatic acids. Another object is to provide a process in which the water removed carries with it to waste only a very small amount of acid.

Another object is to provide a process employing withdrawing agents that remove more water per unit withdrawing agent than other agents which allow operable temperatures with aliphatic acids. Still another object is to provide a process in which the amount of heat required is kept to a low value. It is also an object to provide a process of concentrating aqueous aliphatic acids which is continuous. Another object is to provide a process in which the withdrawing agent is employed in such a manner that the finally dehydrated acid is not contaminated with the agent. A still further object is to apportion and circulate the dehydrating agent. Another object is to provide a process for the partial concentration of acetic, propionic or other fatty acids, or mixtures thereof, from their aqueous solutions. It is also an object to provide a process in which the same medium may be used both as an extracting agent and a water-withdrawing agent.

A further and particularly important object is to provide a process including azeotropic distillation, wherein the azeotropic composition is formed in a zone separate from the zone containing concentrated aliphatic acid. Another object is to provide a process of operating a distillation unit wherein a part of the unit is operated in accordance with simple rectification procedure, the other part of the unit being operated in accordance with azeotropic rectification procedure.

Other objects will appear hereinafter.

These objects are accomplished by the following invention which comprises primarily a distillation process for removing water from aqueous aliphatic acids, but which in some instances may employ extraction steps.

As already alluded to, my invention is primarily concerned with, but not limited to, the use of entraining agents having boiling points, vapor compositions and other characteristics sufficiently close to the characteristics of the concentrated lower aliphatic acid under consideration as to be separable from the acid by rectification with great difficulty if permitted to become mixed therewith.

Propyl acetate is an example of an agent separable with difficulty from concentrated acetic acid. Propyl acetate has a boiling point of approximately 102° C., which is within 20° C. of the boiling point of acetic acid (B. P. approximately 118° C.).

An agent containing a material amount of a difficultly separable agent such as propyl acetate, as, for example, the improved entrainer, propyl acetate-propyl alcohol, of my copending application already referred to, Serial No. 744,250, is also a difficultly separable agent within the scope of this invention.

As stated in the above-mentioned article by Guinot, butyl acetate and the other agents therein described fall within the class of difficultly separable agents embraced by the present invention. The butyl acetate-butyl alcohol and other novel alcohol-containing agents of my copending application Serial No. 744,250 likewise are difficultly separable agents.

The numerous agents, such as allyl acetate 105° C.; amyl chloride 106° C.; dichloromethyl ether 106° C.; butyl formate 107° C.; ethyl iso amyl ester 112° C.; allyl iso amyl ether 120° C.; ethyl amyl ether 120° C.; chloroacetone 121° C.; dibutyl ether (sec) 121° C.; dibutyl ether (iso) 123° C.; propyl propionate 123° C.; iso-amyl formate 124° C.; ethyl propyl ketone 124° C.; methyl butyl ketone 127° C.; allyl acetone 129° C.; crotonyl acetate 129° C.; amyl formate 130° C.; butyl propionate 137° C.; dibutyl ether 141° C.; propyl butyrate 143° C.; dipropyl ketone 144° C., shown in Othmer pending application Serial No. 734,991, also come within this classification with reference to acetic acid.

It will be noted with reference to acetic acid as the aliphatic acid under treatment, that these difficultly separable agents generally have a boiling point within about 25° C. of the boiling point of acetic acid and usually within about 20° C.

In any event there are a number of ways of determining whether any particular entraining agent is difficultly separable.

I have found that the above class of agents, designated herein as a class to the effect "agents separable with difficulty", may be readily employed for the dehydration of aqueous solution containing at least one of the lower aliphatic acids to produce highly satisfactory results and a concentrated acid free of entraining agent provided they are employed in accordance with the hereindescribed invention, so that the concentrated or substantially concentrated aliphatic acid at no time during the process in the distillation unit is permitted to become contaminated with entraining agents. It is to be noted that mixing dilute acid and entraining agent is permissible because dilute acid has water present. The important differentiating feature being, keeping the entraining agent out of contact with the substantially and/or fully concentrated acid which generally will be the acid in the lower portion of the distillation unit.

While the new ester-alcohol agents of my copending application 744,250 will remove water under a variety of conditions, they are particularly adapted for use in accordance with the present invention yielding a high grade concentrated acid, and exceptionally efficient results because of the high capacity of an ester-alcohol for removing water.

For example, propyl acetate-propyl alcohol will remove about 50% more water, under corresponding conditions, than propyl acetate alone. Consequently, I describe the invention with particular reference to ester-alcohol agents because they are preferred, it being remembered, however, that a number of the advantages of my invention may be obtained by employing other agents. It is to be understood that my invention is not limited to the examples shown.

Further details concerning my preferred process and apparatus, and the use with alcohol-containing agents, may be observed from a consideration of the following:

Fig. 1 represents a diagrammatic side elevation of the preferred embodiment of a plant layout of my new distillation unit and associated apparatus for practicing my new process, certain parts being shown in section or broken away and other parts on an enlarged scale for clarity.

In Fig. 1, 2 represents the lower or primarily water distilling column of the unit. This column contains a plurality of bubble plate sections, usually between about 20 and 35 dependent on the capacity required and the efficiency of rectification desired.

Above, and in offset relationship to column 2, is another column designated 3, of construction similar to column 2. This column, when operating in accordance with one aspect of my process, can be considered primarily as an azeotrope fractionating column.

Most of the heat required for distillation is supplied to the system by means of the calandria connected to column 2 at the column section 4 bottom 7 by conduit 6 and to the column side by conduit 8. The acid in the liquid state flows down conduit 6 into the calandria base 9.

The calandria comprises the vertically extending cylinder 4 provided with the base 9 having the valved outlet 11, for withdrawing solid residue or other materials from the calandria. The upper portion of the calandria comprises the enlarged portion 12, provided with the cap 13 and connected to column 2 by conduit 8.

The interior of the calandria may be constructed in any suitable manner, whereby the acid liquid may be heated and vaporized. For example, a plurality of tubes 14 arranged in any suitable boiler tube construction, such as between tube sheets 16 and 17, may be employed. The acid passes through the tubes which are surrounded by an appropriate heating medium. Usually several such sections are required and expansion means 18 may be placed between such sections.

Some of the acid liquid entering the base of the calandria is heated by passing through the several heating sections, finally vaporizing and expanding in the enlarged portion 12, whereupon it passes into column 2 through conduit 8. By virtue of heating the acid stream in this manner, a pinch effect is exerted on the liquid and a well-defined circulation down the pipe 6, up through the calandria and into the column 2 is established.

Part of the acid liquid and/or vapors, instead of circulating as just described, pass through conduits 21 and 22 into an adjacent parallel unit comprising the vertically extending cylindrical shell 23. The interior of the shell may be provided with heating means, such as for example as described with respect to calandria 4. This shell is connected at its bottom 24 with conduit 21 and at the upper part above conduit 22 with another pipe 26, which leads into the side of a small refining column designated 30.

This refining column 30 is of bubble plate construction, similar to the construction of columns 2 and 3, but on a smaller scale. The head 32 of this refining column is provided with the dephlegmator 33 which is connected by means of the valved pipe 34 with the condenser 36. In that the purified concentrated acid passes through this device, it is important that the condenser be constructed of exceptionally high grade materials, such as of the noble metals, high grade Cr-Ni steel or the like, or ceramics or glass. This condenser may be equipped with valved draw off conduits, and the like, 35 for removing the condensate therefrom.

A U-shaped conduit 37, which is in the nature of an overflow conduit, extends up into the lower section of the refining column and connects it with the side of calandria 4.

As will be apparent as the description proceeds, by these connections between calandria 4, unit 23 and the refining column 30 a portion of the fully concentrated, or partially concentrated, acid (dependent on the specific process being employed) is conveniently recovered in a high state of purity in the condenser 36.

Referring now to the upper half of the water distilling column 2, there is provided a large vapor feed line 39, which branches into a plurality of vapor lines, such as 41 and 42. These branch lines lead to the head of a plurality of weak acid vaporizers 43 and 44.

These vaporizers comprise the tall cylindrical shells 46, 47 having conically shaped bottoms 48, 49, equipped with valved outlets 52, 53. The heads 54, 56 of the vaporizers are connected with the branch lines 41, 42.

These evaporators may be heated in any well known manner, either externally or internally; I prefer to employ steam coils (not shown) within the evaporators. Supplying the weak acid to be concentrated in the vapor phase from a plurality of vaporizers, as shown, has a number of advantages in a large installation. For example, the heated acid provides a source of heat at its point of introduction into the column and within the column, thereby requiring less heat to be supplied in the calandria. This better distributes the heat throughout the distillation unit. Solid impurities are kept out of the distillation columns. Also, if one vaporizer is out of use, the equipment may still be operated.

The evaporators are equipped with inlets 57, 58, for feeding in the weak acid. The weak acid may be in the form of an aqueous solution as obtained from cellulose ester manufacture, for example containing about 20–35% acid and the balance water, or the weak acid evaporated in evaporators 46, 47 might be extract comprising acid, water and withdrawing agent.

A further preventative of impurities getting into the distillation columns is obtained by the trap provided in the vapor feed line 39, as at 45. This trap is connected by drain line 40 to the lower portion of vaporizers 46, 47 or conduits leading thereto. As indicated in the drawing, the vapor feed enters column 2 in the upper half and preferably at a point about two-thirds of the way up the lower column.

While I describe my invention with particular reference to the two column arrangement shown, because this represents my preferred embodiment and possesses a number of advantages, such as definition of two zones (i. e. water fractionating zone and azeotrope fractionating zone), more satisfactory construction mechanically, and other advantages, it is to be understood that the invention is not limited specifically thereto but embraces broader embodiments.

That is, my invention could be applied to a single vertical column, as for example a column comprising 30-60 plates, a suitable vertical column is shown in my copending application 744,-250. Or, in stead of employing two columns, three or more might be employed, the process being operated to maintain the separate zones therein in accordance with the present disclosure.

Referring again to my preferred embodiment, column 2 is provided with the horizontally extending vapor outlet 61, through which the vapors fractionated in column 2 may be conducted to the next and upper column 3. The liquid flowing down column 3 is conducted by a U-shaped conduit 62 into a plate section in the lower column 2.

The upper column 3 is provided with a vapor outlet conduit 63 for conducting off the vapors fractionated in this azeotrope column. These vapors are condensed in condenser 64, after which the condensate is led through pipe 66 to the decanter 67. Pipe 66 is provided with the expansion loop 68 and the valved branch conduit 69. This branch conduit may be employed to withdraw or by-pass materials from the system.

The decanter 67 comprises a tank having the sidewalls 71, a bottom 72 and top 73, the condensate pipe 66 being connected to the top. The decanter assembly includes two over-flow basins, namely the inside overflow 74 and the outside overflow 76. The positioning of these overflows and associated parts will be governed by whether the withdrawing agent being employed is heavier or lighter than water. Assuming the apparatus set-up is to employ an ester-alcohol agent with a density less than water, so that it will form the top layer in the decanter, then the arrangement of overflow is as shown in Fig. 1. That is, the inside overflow 74 is positioned in the upper part of decanter 67. To obtain easy and proper flow the overflow may be equipped with an elliptical-shaped mouth. The overflow is connected by means of conduit 77, having the trap 78, to column 3 at about the top plate.

Branching from conduit 77 is the pipe 79, which leads to the sight glass and meter 81. A valve is provided at 82 to assist in controlling the flow of withdrawing agent in this branched line. Another pipe 83 having a liquid trap 84 connects the sight glass meter 81 with the lower column 2, preferably at the head of this column.

As the description proceeds, it will be apparent that the arrangement and functioning of this branch line 79, 81, 83 is of great importance in operating in accordance with the present invention with an acetate-alcohol containing withdrawing agent to obtain highly efficient results. This step is more fully described in Gordon and Bright copending application Serial No. 26,227 of June 12, 1935.

Referring again to decanter 67, it will be noted that the outside overflow 76 is positioned on about the same level as the inside overflow. In the instance under consideration, where the water layer is the lower one, the outside overflow basin is connected to the bottom of the decanter by pipe 86 through which, when the decanter is filled to the proper liquid level, the decanter liquid will cause the water layer to rise through conduit 86 into overflow basin 76. The interior of this basin contains a second, adjustable, shallow, overflow mouth 87, whereby the watery layer can be caused to flow smoothly out of the overflow 76 and through either conduit 88 or 89, whichever preferred. The pipe 89, providing means of refluxing water, if desired.

The conduit 88 may be connected (valved pipe 90) to the flash column 91 of substantially usual construction, being provided with a vapor outlet 92 and condenser 93, wherein the agent flashed over is condensed and returned to the decanter, conduit 77, or some other point is satisfactory, as long as it is returned to the entrainer cycle. The heated water coming off the flash column and at other points in the system may be passed through a heat exchanger to recover the heat therefrom before discharge to the sewer.

Suitable thermometers and/or other temperature recording devices (not shown) will be connected into the system at various points.

Considering now the preferred withdrawing agent.

The use of the preferred type of agents, either the propyl or butyl agents, allows dehydration processes to be carried on at lower temperatures than are possible with any other group of solvents, except the prior art, low boiling class. In fact, the temperatures are practically only a little higher than those necessary with the low boiling solvents. However, this new class of agents is more easily handled than the low boiling solvents, on account of their lower evaporation rates. They present a much more favorable distribution ratio, when used to extract, than on any higher boiling point solvents.

These features are supported in detail in the copending applications already referred to.

I may feed into the apparatus, by vaporizing in vaporizers 46, 47, weak acid either in the form of an aqueous solution (i. e. acid-water) from cellulose ester manufacture or pyroligneous liquor or other source, or in the form of an extract (i. e. acid-water-agent) or a combination of these sources.

While I generally use, when employing the preferred agent, a major proportion of either normal propyl acetate or butyl acetate and a minor proportion of the corresponding alcohol as described, I do not wish to be limited to these exact values and agents, since they have been given by way of illustration only. I prefer to use for the best results in our apparatus normal-propyl alcohol, in the neighborhood of around 13–15%, and the balance substantially all normal-propyl acetate. In the case of butyl alcohol, about 20–45% would be employed, with the balance butyl acetate. Small amounts of water may be present in both instances.

The advantage of using the preferred mixed entrainers of acetate and alcohol over a one-component agent is evident from the following comparison:

| Agent | Azeotrope composition | B. P. of azeotrope |
|---|---|---|
| Propylene chloride | 88% propylene chloride<br>12% water | 78° |
| n-Propyl acetate | 86% n-propyl acetate<br>14% water | 82.4° |
| n-Propyl acetate<br>n-Propyl alcohol | 59½% n-propyl acetate<br>19½% n-propyl alcohol<br>21% water | 82.2° |
| n-Butyl acetate<br>n-Butyl alcohol | 35.3% n-butyl acetate<br>27.4% n-butyl alcohol<br>37.3% water | 89.4° |
| Iso-butyl acetate<br>Iso-butyl alcohol | 46.5% iso-butyl acetate<br>23.1% iso-butyl alcohol<br>30.4% water | 87.4° |

The above data is approximate, as well as the various other boiling points and data set forth herein, but considered accurate within a reasonable range allowed for experimental error in measurements made in large apparatus.

It will be noted that, when properly employed as withdrawing agents, the acetate-alcohol mixtures carry over the largest amount of water. This is very important, since it may readily be seen that the amount of water taken over is much greater than that taken over by any of the agents heretofore known. Furthermore, this large amount of water is taken over at temperatures in the vicinity of that required by propyl acetate alone for example. In order to obtain optimum results it is, of course, important to maintain the best ester-alcohol ratio for the particular apparatus, not only when the apparatus is initially charged with ester-alcohol of the proper composition but throughout continuance of operation.

The following example is an illustration of my preferred process, reference being made in particular to Fig. 1 for an understanding thereof. At the onset, it is to be understood that, in the following description of my process, the specific values, specific materials, specific column and the like, set forth therein, are merely for the purpose of illustration and not to be construed as limiting the invention.

The upper azeotrope column 3 is charged with a predetermined amount of entraining agent, as for example n-propyl acetate-n-propyl alcohol, or n-butyl acetate-n-butyl alcohol. If the column has previously been operated, this predetermined amount will have been determined in the prior operation and this known required number of hundreds of pounds of agent will be introduced into the entrainer system, generally through the decanter and periodically until the total amount of agent is in the system.

If the approximate quantity of solvent and other features concerning the column are not known, then the column can be placed in operation in accordance with the following procedure, varied to some extent dependent upon whether it is desired to produce a wet acid or a dry acid, the agent to be employed and other specific considerations.

While this procedure is to be applied in particular to columns of which no characteristics are known, it may be applied in instances to columns which have been previously operated and of which the withdrawing agent capacity is known. In accordance with one of my processes, a wet acid is produced (i. e., an acid containing several percents of water).

Producing a wet acid in the disclosed apparatus possesses a number of advantages. The weak acid fed to evaporators 46 and 47 being from a commercial source, such as cellulose acetate manufacture, may be somewhat variable. In some instances, the acid being concentrated may contain only 25% acid, in other instances, the acid content may exceed 30%. This acid is concentrated in the present set-up to in the neighborhood of 50–80% or higher, thereby producing a constant product, though not anhydrous. In accordance with the procedure of this invention, the production of this wet acid of substantially constant strength therefrom is fed to a carefully controlled distillation system of construction similar to the present, wherein the acid may be completely concentrated to produce pure uncontaminated anhydrous acid under carefully controlled conditions. As pointed out, propyl and butyl acetate containing agents are very successful entrainers, provided they are not permitted to get into concentrated acid.

Assuming that propyl acetate-propyl alcohol is the agent to be employed and assuming a wet acid is desired, the following steps would be taken. The upper column 3 would be charged with the acetate-alcohol entraining agent in a predetermined amount. This could be done by partially or completely filling the decanter with entraining agent, with or without a previous addition of a shallow layer of water. This amount of entraining agent should be insufficient to balance the column when the usual run of dilute acid is to be fed at a predetermined rate.

The weak acid vaporized from the two evaporators 46 and 47, is conducted through pipe 39 into the lower column these feed vapors being at a temperature of above 100° C. and below the boiling point of the aliphatic acid under treatment. If the weak acid supplied comprises merely an aqueous solution of acid and water, the acid and some of the water tend to go down in column 2 and some acid and a greater amount of water up the column. The vapors traveling upwardly in the column pass through conduit 61 into the upper column 3, permeating the entire system and out through outlet conduit 63 into the condenser 64 and finally through conduit 66 into the decanter. The condensate running into the decanter displaces a portion of the predetermined amount of entraining agent which has been charged into the decanter and causes it to flow out of the over-flow 74 into the return-pipe 77 and the by-pass 79. The entrainer in pipe 77 is returned to the upper column 3 and after a short interval this upper column becomes permeated with entraining agent.

In the lower column, the acid tends to go down the column and out of the base thereof through the conduit 6 into the calandria, where some of the acid and any water are vaporized and pass back into the water fractionating column 2 again. By this means, in the lower column 2, the water and some of the acid are fractionated from the remainder of the acid. In the upper column 3 and also just before they leave column 3, these acid and water vapors contact the entrainer displaced from the decanter and ternary azeotrope compositions of water and entrainer are formed. Since the azeotrope boils materially lower than the acid and/or water, it becomes readily fractionated from the acid and/or water, passing in the vaporous condition out through the outlet conduit 63 to the condenser and decanter. The acid and/or water flow downwardly in column 3 and thence through U-shaped pipe 61 into the lower column.

In order to provide the right and desired amount of entraining agent within the column, the water layer overflowing from the decanter into the over-flow basin 76 is examined and analyzed. Under the conditions that have been just described, probably a substantial content of acid will be found in this sweet water, because of the insufficient original addition of entraining agent to the system. This content of acid, which may be several percent in the sweet water, indicates that there should be more entrainer added to the system and several hundred pounds of additional entrainer are generally required to be added to the system in a commercial set-up.

On the other hand, since a wet acid is being produced, too much entrainer should not be added to the system in the upper distillation column. By observing the temperatures in various parts of the column and examining and analyzing the concentrated acid liquid flowing through the pipes 62 and 66, or at some other low point in the column bases, for a propyl acetate-alcohol content, it can be determined if too large an amount of acetate-alcohol has been added. That is, if the concentrated acid, for example in any portion of the calandria section or the vicinity thereof shows an acetate-alcohol content, this evidences that the column is flooded or has too much acetate-alcohol entrainer in the system.

When the desired conditions of low acid in the sweet water and no entrainer in the calandria section have been obtained, or even during the procedure to attain these conditions, in order to assist in maintaining the optimum conditions, a portion of the acetate-alcohol is by-passed through the valved circuit 79, 81, 83 into column 2. The exact amount to by-pass usually being somewhat between 5% and 30%, will be governed by a number of factors, such as the concentration of the weak acid being fed in through vapor feed line 39. In any event, the upper ester-alcohol layer in the decanter 67 is examined from time to time and, if the ester content of the entrainer appears to be diminishing, then the quantity of separated entrainer being by-passed through the pipes 79, 83 should be increased. On the other hand, if the acetate content is shown by analysis of the entrainer layer in the decanter to be increasing, then the amount of entrainer being by-passed should be reduced. In another manner, the water layer from the decanter may be examined for alcohol and ester content. If it appears that large amounts of entrainer are being lost in the water layer and being passed through the flash column for recovery, as observed by the amount of entrainer being returned from the flash column, this would be an indication that more decanted entrainer should be by-passed through the sealed line 79, 83. Since any change is gradual, by the above described control steps, it is possible to check undesirable tendencies and maintain the ester-alcohol entrainer under optimum conditions of operation. The above procedure is applicable to other types of columns and distillation set-up.

As the process proceeds continuously, the ester and alcohol with the amount of water necessary to form a ternary azeotrope are distilled from the top of the column, passing to the condenser and then into the decanter, where the distillate becomes separated into layers. The watery layer may flow to a solvent recovery system or reflux and the entrainer layer is returned to the columns.

As already indicated above a part of the entrainer layer in its return passage may be by-passed.

The acid and water in column 2 are dropped to calandria 4 then part to supplemental unit 23 which may be supplied with heat by steam, or in any other suitable manner. From these units is distilled the wet acetic acid, which is fractionated in refining column 30 and finally condensed in condenser 36.

The resulting wet acid could be used as obtained, or it may be completely dehydrated in a number of different ways, among which may be mentioned the folowing; by azeotropically distilling the wet acid with about just the right amount of n-propyl acetate, iso-propyl acetate, or propylene chloride to remove the remaining water as an azeotrope, if anything keeping a very minute excess of water present. Or, the process of azeotropic distillation described in my co-pending application No. 744,250 may be employed.

Therefore, the above steps are carried out periodically, the sweet water being examined for acid and the acid in the vicinity of the calandria, or at some point preferably below the vapor feed, being examined for acetate-alcohol entrainer until the following conditions prevail. The acid content in the sweet water should be under 1% and preferably under 0.1%. The acid in the calandria section, when a wet acid is being produced, should be entirely free of any traces of ecetate-alcohol entrainer and contain the desired water content. Generally when starting the process by filling the decanter with entrainer, which subsequently becomes displaced by the condensate coming over, it will be necessary to add additional entrainer to the system several times to bring about the desired conditions of a low acid content in the sweet water, care being taken that the quantity of ester-alcohol entrainer added in the entrainer system of the upper column 3 is not so great as to be found in the lower column 2 at points much below the vapor feed. As these additional entrainer additions are made, it will be noted that the temperature readings throughout column 3 and in the top of column 2 change. These temperature readings to a skilled operator will also serve as a guide to the attainment of the desired ester-alcohol content of the system.

It may be stated at this point that it is also a feature of the present invention not only to produce a wet acid but to so control the process that a completely dehydrated acid which does not contain any of the entraining agent is produced. In general, this may be done in the following way.

In producing anhydrous acid in one step, the process is maintained, in general, much the same as when producing a wet acid, so that in the lower part of the unit, as in column 2, acid and water are being rectified, and no agent is present at plates materially below the feed zone, the upper part of the system, as in column 3, containing the bulk of the agent.

This condition may be obtained by balancing the column according to the principles substantially as already set forth. If the column has been previously operated, the total amount of agent to charge for producing the desired condition may be known. Or, in any event, the column may be balanced as already described, by charging insufficient entraining agent into the upper part of the distillation unit, examining the acid content of the sweet water, and adding further amounts of agent as may be required to reduce the acid content of the sweet water. It is of great importance, however, that the quantity of entrainer finally in the system when employing my novel unitary process of producing substantially anhydrous acid in one distillation setup, does not appear in the unit at points substantially in the vicinity of the lower part of the column where the concentrated or substantially concentrated acid is found. Generally then, and in the type unit shown in Fig. 1, this would require that substantially no entrainer be found much below the feed zone.

The production of concentrated acid by my new procedure when compared with the prior art may appear to involve operation with an insufficiently and improperly charged azeotropic distillation unit. However, that is not the case. My unit operates so that most of the water present is removed from the acid in the lower part of the distillation unit by simple fractionation. While this fractionated water will carry with it substantial quantities of acid, as it passes up through the bubble plates some separation takes place, but in any event, material losses of acid do not occur because the water and acid contact the azeotrope-forming entrainer in the upper part of the unit with the result that the water is separated from the acid being carried along, the acid returning to the lower part of the unit.

This novel procedure is to be distinguished from various processes in the prior art where a partially concentrated acid has been produced in one column under conditions without reference to whether the entrainer is permitted to contact the acid, after which the partially concentrated acid is fully concentrated with a well-known low-boiling point entrainer, such as benzol.

Assuming that the process is in operation with n-propyl acetate-n-propyl alcohol, the functioning of the unit is as follows: Upon the upper plates of column 3 there exists a ternary azeotrope of normal-propyl acetate-n-propyl alcohol-water, boiling at about 82° C. which may be readily fractionated from water—B. P. 100° C.—and acetic acid—B. P. 118° C. This constant boiling mixture is vaporized by the heat supplied to the column from the calandria and the vapor feed, and this vaporous mixture passes over through the pipe 63 into the condenser 64, where it is condensed into a liquid mixture which then passes through the pipe 66 into the decanter 67.

In this decanter, the water, being the heavier of the liquids, settles to the bottom and passes off therefrom by means of pipe 86 leading to the overflow and preferably to recover some of the agent, to a solvent recovery system 91. The pipes 71, 77 return most of the normal-propyl acetate-n-propyl alcohol to the head of the column. The other portion (around 10-15%) of the n-propyl acetate-n-propyl alcohol may be by-passed to a point in the lower column above the vapor feed.

The process being in continuous operation, it is usually unnecessary to add further amounts of n-propyl acetate-n-propyl alcohol to the system. Any additions that are made would be used only to make up for the small amount of entrainer which may be lost in the system from slight leakage or by being carried off in some manner, such as by mechanical occlusion.

In either the first-described process for producing wet acid from column 2, or the second for producing anhydrous acid directly therefrom, it is important for smooth operation that the processes be operated with the assistance of the two vaporizers 46, 47. Vaporous weak acid is continuously introduced through the pipe 39 at a rate equivalent to the capacity of the column 2 for dehydrating the aqueous acid. The lower portion of the column 2 will then perform the function of fractionating water and acid. The more concentrated acid refluxes into the calandria, where a portion accumulating is vaporized off through the pipe 36 and conducted to the refining still 30, after which it is condensed.

If, instead of introducing the aqueous acid as described (i. e. acid-water), it is desired to employ extract (i. e. acid-water-agent), the extract from an extraction column or agitator system is fed into evaporators 46, 47, either alone or preferably with aqueous aliphatic acid, wherein the extract is evaporated and conducted into the lower column 2. Since in this instance a certain amount of the withdrawing agent is being supplied in the feed after the column reaches the proper condition, namely, so that content of acid in the sweet water is low, etc., an amount of agent equivalent to the amount of agent being supplied in the feed would be withdrawn from the decanter and returned to the extractor. The amount of agent returned to the upper column and by-passed to the lower column would be dependent on the excess acid-water content of the feed over and above that taken care of by the agent in the feed.

When feeding both extract and dilute acid, one feed heater evaporator may be employed for the extract and the second for the dilute acid. Or the extract and dilute acid in the liquid state may be blended and the resultant mixture fed into both feed heaters and vaporized.

In the foregoing description, I have directed the description to a large extent to the use of n-propyl acetate-n-propyl alcohol of butyl acetate-butyl alcohol, because I consider these agents very satisfactory.

In my investigation, I have also determined that the other ester-alcohol agents listed are satisfactory and are ones to which the processes and apparatus herein described may be applied. Generally then, the preferred agent may be described as comprising principally an ester of an aliphatic acid with an aliphatic alcohol, and an aliphatic alcohol, or as an acetate-containing agent boiling within about 20° C. of acetic acid. It being understood, however, that while the invention is particularly suitable for such acetate-containing agent, it may be applied to the other agents described.

The propyl propionate-propyl alcohol mixture is of particular value in the dehydration of propionic acid. Iso-butyl-acetate-iso-butyl alcohol or secondary butyl acetate-secondary butyl alcohol combinations are very useful in concentrating acetic acid, when employed in accordance with the present invention.

In employing the other agents in the processes and apparatus which have been described above in detail with respect to n-propyl acetate-n-propyl alcohol and butyl acetate-butyl alcohol, of course, due regard will be had for any differences in characteristics in the agents. That is, for example, some ester-alcohol combinations yield ternary azeotrope with water which boils at temperatures higher than the boiling point of the azeotrope formed in the distillation step when n-propyl acetate-n-propyl alcohol or butyl acetate-butyl alcohol are the entrainers. It is, therefore, apparent, due regard must be had for such differences and the process modified accordingly.

While the process is particularly applicable to the class of agents described herein as "separable with great difficulty" from concentrated acid, a number of the advantages of my invention have wider application. It is clear, since my new process will operate successfully with entraining agents boiling sufficiently close to acetic acid as to present great difficulties of separation if they become mixed therewith, that the process may be employed with other entraining agents not possessing this difficulty.

In practicing my invention, it will, of course, be kept in mind that to some extent the relative amounts of water and entrainer in the distillation unit at any one time are functions of the particular unit design and the relative sizes of those portions of the unit which contain the entrainer and water. The amount of entrainer as already set forth in detail, is governed to a large extent by the requirements of the acid content of the sweet water. As already indicated, should higher acid contents in the sweet water be permissible, then smaller amounts of entrainer may be present in the system. That is to say, in accordance with my invention, it is not absolutely necessary to know the exact azeotropic ratios of the various entrainers with water, but that the process may be carried out continuously and satisfactorily by proceeding as I have described above.

From the foregoing, it will be apparent that my invention may be carried out in other forms of apparatus of which Fig. 1 is given for the purpose of illustration and as the preferred embodiment. While in Fig. 1 two columns have been shown, it is to be understood that, for other constructions, it may be desirable to construct such a column in 3 or more sections placed one above or alongside of the other or in staggered relation. Other forms of apparatus and methods of carrying out the invention may be employed without departing from the spirit and scope thereof.

It will also be understood that the customary precautions for preventing heat losses by suitable insulation will be observed. The parts which contact with the acids are made out of materials suitable for that purpose, such as copper or copper alloys, aluminum alloys, iron silicon alloys, and stainless steel, such as 18% Cr–8% Ni variety, for example. Parts that are subjected to heat will also be constructed of suitable heat-resisting materials. The process is preferably operated under about atmospheric pressure conditions, although it can be conducted with the system at pressure either above or below atmospheric. When I refer to boiling points and the like, I refer to this data as being obtained under normal atmospheric conditions. Suitable meters and thermometers are to be employed where necessary.

The above disclosure further shows that an ester-alcohol entrainer is highly efficient in the concentration of aliphatic acids, including acetic, propionic and others, over long periods in continuous operation when properly carried out. I have found that the process herein described is especially effective in the dehydration of aqueous acetic acid which may contain in some instances varying amounts of other aliphatic acids, as would be the case of pyroligneous liquor.

What I claim is:

1. The continuous process of dehydrating aqueous materials containing at least one of the lower aliphatic acids by a process including azeotropic distillation in a distillation unit containing plates with a withdrawing agent which forms with water an azeotropic composition boiling below the boiling point of water to produce a substantially concentrated acid free of withdrawing agent at all times that it occurs as concentrated acid in the process, which comprises supplying an aqueous acid-containing material to be concentrated to a plate of the distillation unit containing withdrawing agent distributed through the upper portion of the unit in an amount insufficient to drop below the said aqueous acid feed plate, heating the lower part of the unit to vaporize dilute aqueous acid upwardly in the unit and to reflux a substantially more concentrated acid, maintaining the lower part of the unit free of withdrawing agent, causing the vapors traveling upwardly in the distillation unit to meet in the upper part of the unit above the feed, downwardly progressing withdrawing agent, vaporizing water and withdrawing agent from the upper part of the unit, condensing those vaporized materials, separating at least a part of the withdrawing agent from the condensate and returning it to the upper part of the unit.

2. A continuous process for dehydrating aqueous lower aliphatic acid by a process including azeotropic distillation, which comprises distributing withdrawing agent in the upper portion of a distillation system in an amount insufficient to drop below the acid feed zone, supplying the aqueous acid to be concentrated in the vapor phase to a feed zone intermediate between a water rectifying zone and an azeotrope forming zone, maintaining the water rectifying zone below the feed zone substantially free of withdrawing agent, rectifying water and acid in the water-rectifying zone, conducting the vapors from this zone into the upper azeotrope-forming zone and into contact with the withdrawing agent, conducting vapors containing water and withdrawing agent at least partly in the form of an azeotrope from this upper zone, recovering withdrawing agent therefrom and returning it to the upper zone, and withdrawing substantially completely dehydrated acid free of withdrawing agent from the water rectifying zone.

3. The continuous process of dehydrating aqueous materials containing at least one of the lower aliphatic acids by a process including azeotropic distillation in a distillation unit with a withdrawing agent which forms with water an azeotropic composition boiling below the boiling point of water to produce a substantially concentrated acid free of withdrawing agent at all times that it occurs as concentrated acid in the process, which comprises supplying in the vapor state a dilute acid-containing material to be concentrated to a distillation unit containing withdrawing agent distributed through the upper portion of the unit in amount insufficient to drop below the acid feed, supplying heat to the lower part of the unit to vaporize dilute aqueous acid upwardly in the unit and to reflux a substantially more cencentrated acid, maintaining the lower part of the unit free of withdrawing agent, causing the vapors traveling upwardly in the distillation unit to meet in the upper part of the unit above the feed, downwardly progressing withdrawing agent, vaporizing water and withdrawing agent at least partly in the form of an azeotrope and substantially free of acid from the upper part of the unit, condensing these vaporized materials, separating at least a part of the withdrawing agent from the condensate and returning it to the upper part of the unit and withdrawing dehydrated acid vapor free of agent from the lower part of the unit.

4. The continuous process of dehydrating aqueous lower aliphatic acid by a process including azeotropic distillation, which comprises distributing through the upper portion of a distillation system having zones a withdrawing agent characterized by having a boiling point within approximately 20° C. of the boiling point of the acid being concentrated, in an amount insufficient to drop below the acid feed zone, supplying the aqueous acid to be concentrated to a feed zone intermediate between a water rectifying zone and an azeotrope forming zone, maintaining the water rectifying zone below the feed zone substantially free of withdrawing agent, rectifying water and acid from this zone, conducting the vapors from this zone into the upper azeotrope-forming zone and into contact with withdrawing agent, conducting water and withdrawing agent at least partly in the form of an azeotrope from this upper zone, recovering the withdrawing agent therefrom and returning it to the upper zone, and withdrawing substantially completely dehydrated acid from the water rectifying zone.

5. The process of substantially dehydrating aqueous materials containing acetic acid by a continuous process including the use of a distillation column having plates and an alcohol-containing entraining agent, which comprises distributing an alcohol-containing entraining agent in the upper portion of a distillation column in an amount insufficient to drop below the acetic acid feed plate, feeding aqueous acetic acid-containing materials to the column, supplying heat to the lower part of the column to cause water-containing vapors to be evolved and travel upwardly in the column, maintaining the lower part of the column free of entraining agent, causing the vapors evolved from the lower part of the column to contact entraining agent in the upper part of the column, vaporizing water and entraining agent at least partly in the form of an azeotrope from the upper part of the column, and withdrawing a substantially fully concentrated acid free of entraining agent from the lower part of the column.

6. The continuous process for dehydrating aqueous solutions containing acetic acid by a process including azeotropic distillation in a distillation unit having plates, which comprises distributing through the upper portion of the unit a withdrawing agent comprised substantially of normal-propyl acetate in a quantity insufficient to drop below the acetic acid feed plate of the unit, supplying the acetic acid-containing solution to be concentrated to the distillation unit feed plate, heating the lower part of the unit to vaporize the dilute aqueous acid upwardly in the unit and to reflux a substantially concentrated acid, maintaining the lower part of the unit free of normal-propyl acetate, causing the vapors traveling upwardly in the distillation unit to meet in the upper part of the unit above the acid feed downwardly progressing normal-propyl acetate, vaporizing water and normal-propyl acetate at least partly in the form of an azeotrope from the upper part of the unit, condensing these vaporized materials, separating at least a part of the normal-propyl acetate from the condensate, and returning it to the upper part of the unit.

7. The process of dehydrating aqueous acetic acid by a process including azeotropic distillation with withdrawing agent comprised principally of normal-propyl acetate and normal-propyl alcohol, which comprises supplying the aqueous acetic acid to be concentrated to a feed zone intermediate between a water rectifying zone and an azeotrope-forming zone, distributing normal-propyl acetate and normal-propyl alcohol through the azeotrope-forming zone in a quantity insufficient to drop below the feed zone, maintaining the water rectifying zone substantially free of normal-propyl acetate and normal-propyl alcohol, rectifying water and acid from this zone into the azeotrope-forming zone and into contact with normal-propyl acetate and normal-propyl alcohol, conducting an azeotrope composition containing water, normal-propyl acetate and normal-propyl alcohol from this azeotrope-forming zone, recovering the normal-propyl acetate and normal-propyl alcohol from these materials, and returning it to the azeotrope-forming zone.

8. The process of dehydrating aqueous acetic acid by a process including azeotropic distillation with withdrawing agent comprised principally of normal-butyl acetate and normal-butyl alcohol, which comprises supplying the aqueous acetic acid to be concentrated to a feed zone intermediate between a water rectifying zone and an azeotrope-forming zone, distributing normal-butyl acetate and normal-butyl alcohol through the azeotrope-forming zone in a quantity insufficient to drop below the feed zone, maintaining the water rectifying zone substantially free of normal-butyl acetate and normal-butyl alcohol, rectifying water and acid from this zone into the azeotrope-forming zone and into contact with normal-butyl acetate and normal-butyl alcohol, conducting an azeotrope composition containing water, normal-butyl acetate and normal-butyl alcohol from this azeotrope-forming zone, recovering the normal-butyl acetate and normal-butyl alcohol from these materials, and returning it to the azeotrope-forming zone.

9. The process of dehydrating aqueous acetic acid by a process including azeotropic distillation with withdrawing agent comprised of about 20–45% normal-butyl alcohol and the balance principally butyl acetate, which comprises supplying the aqueous acetic acid to be concentrated to a feed zone intermediate between a water rectifying zone and an azeotrope-forming zone, distributing normal-butyl acetate and normal-butyl alcohol through the azeotrope-forming zone in a quantity insufficient to drop below the feed zone, maintaining the water rectifying zone substantially free of normal-butyl acetate and normal-butyl alcohol, rectifying water and acid from this zone into the azeotrope-forming zone and into contact with normal-butyl acetate and normal-butyl alcohol, conducting an azeotrope composition containing water, normal-butyl acetate and normal-butyl alcohol from this azeotrope-forming zone, recovering the normal-butyl acetate and normal-butyl alcohol from these materials, and returning it to the azeotrope-forming zone.

10. The process of dehydrating aqueous acetic acid by a process including azeotropic distillation with withdrawing agent comprised principally of secondary-butyl acetate and secondary-butyl alcohol, which comprises supplying the aqueous acetic acid to be concentrated to a feed zone intermediate between a water rectifying zone and an azeotrope-forming zone, distributing secondary-butyl acetate and secondary-butyl alcohol through the azeotrope-forming zone in a quantity insufficient to drop below the feed zone, maintaining the water rectifying zone substantially free of secondary-butyl acetate and secondary-butyl alcohol, rectifying water and acid from this zone into the azeotrope-forming zone and into contact with secondary-butyl acetate and secondary-butyl alcohol, conducting an azeotrope composition containing water, secondary-butyl acetate and secondary-butyl alcohol from this azeotrope-forming zone, recovering the secondary-butyl acetate and secondary-butyl alcohol from these materials, and returning it to the azeotrope-forming zone.

11. The process of dehydrating aqueous acetic acid by a process including azeotropic distillation with withdrawing agent comprised of about 20–45% secondary-butyl alcohol and the balance principally secondary-butyl acetate, which comprises supplying the aqueous acetic acid to be concentrated to a feed zone intermediate between a water rectifying zone and an azeotrope-forming zone, distributing secondary-butyl acetate and secondary-butyl alcohol through the azeotrope-forming zone in a quantity insufficient to drop below the feed zone, maintaining the water rectifying zone substantially free of secondary-butyl acetate and secondary-butyl alcohol, rectifying water and acid from this zone into the azeotrope-forming zone and into contact with secondary-butyl acetate and secondary-butyl alcohol, conducting an azeotrope composition containing water, secondary-butyl acetate and secondary-butyl alcohol from this azeotrope-forming zone, recovering the secondary-butyl acetate and secondary-butyl alcohol from these materials, and returning it to the azeotrope-forming zone.

JACK J. GORDON.